June 5, 1951     H. A. GENTHE     2,555,925
FLUID JACK
Filed July 13, 1949     2 Sheets-Sheet 1
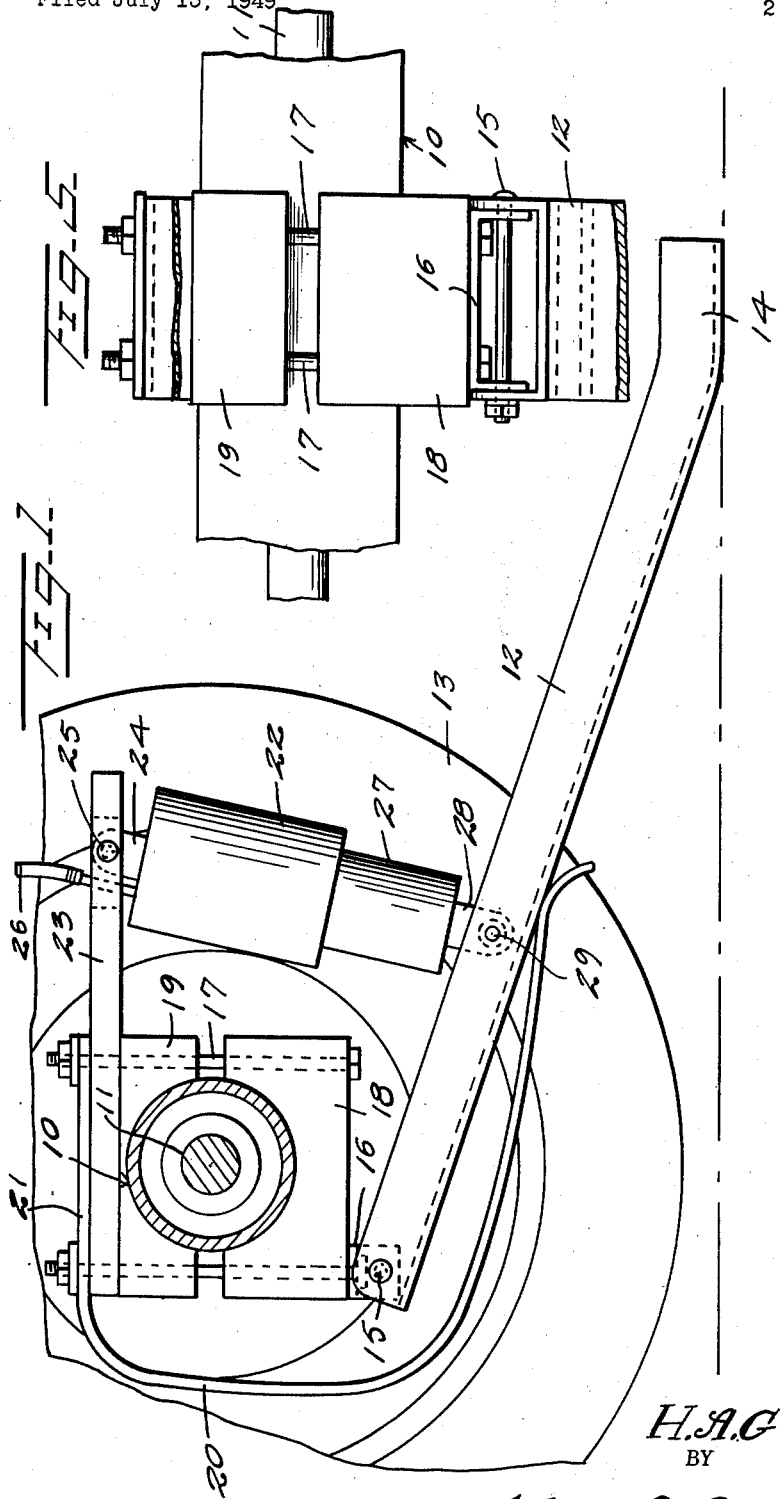
INVENTOR.
H. A. Genthe
BY
Kimmel & Crowell
ATTORNEYS

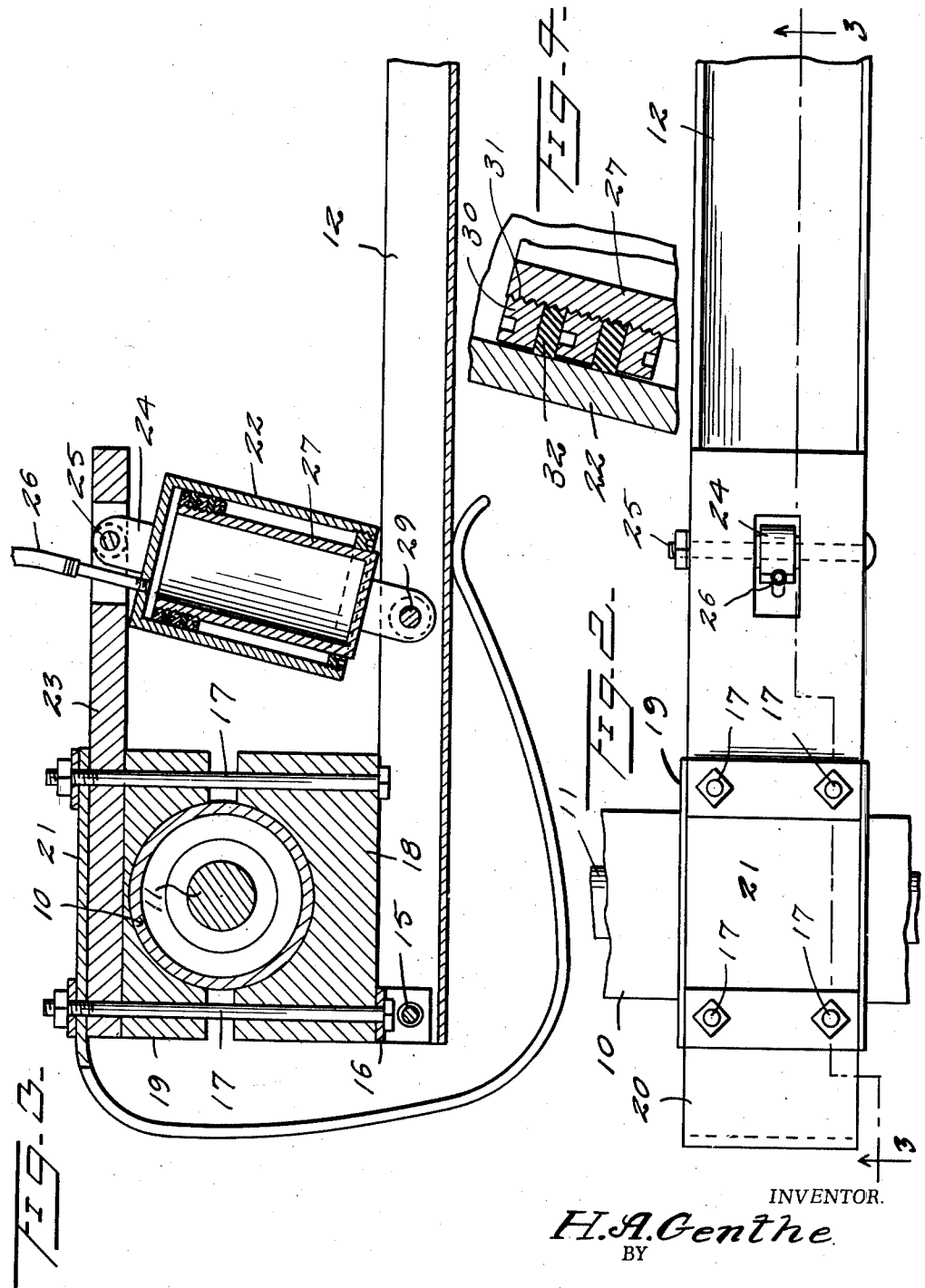

Patented June 5, 1951

2,555,925

UNITED STATES PATENT OFFICE 2,555,925

FLUID JACK

Henry A. Genthe, Burlington, Colo.

Application July 13, 1949, Serial No. 104,467

1 Claim. (Cl. 254—86)

This invention relates to hydraulic jacks.

An object of this invention is to provide a hydraulic jack adapted to be mounted on a wheel axle of a vehicle which is adapted when extended to raise a wheel from the ground.

Another object of this invention is to provide a hydraulic jack for mounting on a vehicle axle which is connected to a hydraulic pressure system for selectively extending or retracting the jack.

A further object of this invention is to provide a hydraulic jack which is of simple construction and can be mounted on a vehicle axle housing without altering the housing, the lifting arm or lever being biased to inoperative position by means of a bowed spring.

With the above and other objects in view, my invention consists in the arrangement, combination and details of construction disclosed in the drawings and specification, and then more particularly pointed out in the appended claim.

In the drawings,

Figure 1 is a detail side elevation of a hydraulic jack constructed according to an embodiment of this invention, showing the jack in operative position mounted on a vehicle axle, the latter being shown in section, Figure 2 is a plan view of the jack, Figure 3 is a sectional view taken on the line 3—3 of Figure 2, Figure 4 is a fragmentary enlarged sectional view of the cylinder and piston, Figure 5 is a detail rear elevation, partly broken away and in section, of the jack.

Referring to the drawings, the numeral 10 designates generally an axle housing connected with a vehicle and within which an axle 11 is rotatably mounted. A pair of wheels 13 are mounted on the opposite ends of the axle 11, and in the present instance the wheels 13 are the rear or driving wheels of the vehicle.

In order to provide a means whereby the wheels 13 may be raised from the ground or road surface, I have provided a jack lever 12 which is formed with an obtusely bent lower end 14. The upper end of the lever 12 is pivotally mounted on a pivot 15 which is carried by an inverted U-shaped member 16 secured to a pair of clamping bolts 17. The clamping bolts 17 extend through the rear portions of a pair of clamping blocks 18 and 19 which engage about the axle housing 10. The block 18 is a lower block and as shown in Figure 5, the lever 12 is of U or channel shape.

The lever 12 is constantly urged upwardly to an inoperative position by means of a substantially C-shaped spring 20 formed with a relatively straight upper end 21 engaging on the upper side of the upper block 19. The spring 20 is secured to the bolts 17 at the upper ends of the latter.

A hydraulic cylinder 22 is rockably disposed between the lever 12 and a supporting bar or plate 23, the latter being secured between the upper end 21 of spring 20, and the upper side of the clamping block 19. The cylinder 22 is formed with an ear 24 rockably mounted on a pivot 25 which is carried by the supporting member 23, and the cylinder 22 is connected by means of a flexible connection 26 to a source of fluid pressure supply. The cylinder 22 has slidable therein a piston 27 formed with an ear 28 which is pivotally secured on a pivot 29 engaging between the parallel sides of the lever 12. The piston 27 has mounted thereon a plurality of rings 30 which are threaded on external threads 31 formed on the upper end of the piston 27 and sealing rings or gaskets 32 are interposed between pairs of the rings 30.

In the use and operation of this jack, when it is desired to raise the wheel 13, the fluid pressure is placed in communication with the cylinder 22. Piston 27 will be moved downwardly and lever 12 will be rocked downwardly so that the foot member 14 will engage the ground or road surface. When it is desired to raise the lever 12 to permit the wheel 13 to engage the ground or road surface the fluid pressure supply to cylinder 22 is cut off or withdrawn so that lever 12 may be rocked upwardly to a released position which is the position shown in Figure 3, by means of the spring 20. It will be understood that there may be two of these levers 12 positioned adjacent each wheel at the rear of the vehicle so that either one or both of the wheels may be raised to permit changing of the tire.

I do not mean to confine myself to the exact details of construction herein disclosed, but claim all variations falling within the purview of the appended claim.

What I claim is:

A vehicle mounted jack comprising upper and lower clamping members having aligned apertures therethrough and opposed semi-circular recesses adapted to fit on upper and lower sides of a vehicle axle, a horizontal plate having apertures therethrough aligned with the apertures in said clamping members mounted on the upper clamping member and extending outwardly therefrom in a direction at right angles to said axle, said plate having an aperture in the extending portion thereof, a U-shaped member having apertures therein aligned with certain of the apertures in said clamping members on the underside of said lower clamping member, a C-shaped spring having apertures in one end thereof aligned with the apertures of said plate and having its opposite end extending beneath said lower clamping member, bolts extending through all of said aligned apertures clamping said spring, plate, clamping members and U-shaped member securely to said axle, a channel-shaped jack lever pivotally secured to the depending sides of said U-shaped member, said lever having an obtusely bent free end adapted for engagement with a road surface, the free end of said spring abutting the underside of said jack lever and normally biasing the same out of engagement with the road, a hydraulic cylinder having one end pivotally connected in said aperture in the extending portion of said plate, a piston movable in said cylinder, a pivotal connection between the free end of said piston and an intermediate point of said jack lever, and means for introducing fluid to said cylinder to extend said piston to pivot said jack lever and elevate said vehicle.

HENRY A. GENTHE.

REFERENCES CITED

The following references are of record in the file of this patent:

UNITED STATES PATENTS

| Number | Name | Date |
|---|---|---|
| 2,322,358 | Hansen | June 22, 1943 |